(12) United States Patent
Marra et al.

(10) Patent No.: US 10,535,105 B2
(45) Date of Patent: Jan. 14, 2020

(54) SYSTEMS AND METHODS TO CONTROL PROVISION OF CONTENT ITEMS IN A FEED

(71) Applicant: Facebook, Inc., Menlo Park, CA (US)

(72) Inventors: Gregory Matthew Marra, San Francisco, CA (US); Jason Jiawei Liao, Mountain View, CA (US); Sikai Zhu, Union City, CA (US); Jiesi Luo, Sunnyvale, CA (US); Robin Maxime Clediere, San Francisco, CA (US); Cemre Güngör, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 306 days.

(21) Appl. No.: 14/880,053

(22) Filed: Oct. 9, 2015

(65) Prior Publication Data

US 2017/0102862 A1 Apr. 13, 2017

(51) Int. Cl.
*G06F 3/048* (2013.01)
*G06Q 50/00* (2012.01)

(52) U.S. Cl.
CPC .................. *G06Q 50/01* (2013.01)

(58) Field of Classification Search
CPC .................................. G06Q 50/01
USPC .................. 709/204; 715/783, 745
See application file for complete search history.

(56) References Cited

U.S. PATENT DOCUMENTS

| | | | |
|---|---|---|---|
| 2005/0268237 A1* | 12/2005 | Crane | G06F 3/0481 715/732 |
| 2007/0250510 A1* | 10/2007 | Nachman | G06F 17/30899 |
| 2013/0031034 A1 | 1/2013 | Gubin et al. | |
| 2013/0031489 A1 | 1/2013 | Gubin et al. | |
| 2013/0246521 A1* | 9/2013 | Schacht | G06Q 50/01 709/204 |

* cited by examiner

*Primary Examiner* — Andrey Belousov
(74) *Attorney, Agent, or Firm* — Sheppard Mullin Richter & Hampton LLP

(57) ABSTRACT

Systems, methods, and non-transitory computer readable media are configured to provide a plurality of control modes to selectively control display of content items in a news feed of a user. One or more content items associated with a predetermined entity selected by the user or a predetermined event are identified based on at least one control mode of the plurality of control modes. Display of at least one content item of the one or more content items is provided in the news feed of the user.

20 Claims, 7 Drawing Sheets

500

```
┌─────────────────────────────────────────────────────────────────┐
│ Provide a plurality of control modes to selectively control     │
│ display of content items in a news feed of a user                │
│                            502                                   │
└─────────────────────────────────────────────────────────────────┘
                                 │
                                 ▼
┌─────────────────────────────────────────────────────────────────┐
│ Identify one or more content items associated with a            │
│ predetermined entity selected by the user or a predetermined    │
│ event based on at least one control mode of the plurality of    │
│ control modes                                                    │
│                            504                                   │
└─────────────────────────────────────────────────────────────────┘
                                 │
                                 ▼
┌─────────────────────────────────────────────────────────────────┐
│ Provide display of at least one content item of the one or      │
│ more content items in the news feed of the user                  │
│                            506                                   │
└─────────────────────────────────────────────────────────────────┘
```

FIGURE 5

SYSTEMS AND METHODS TO CONTROL PROVISION OF CONTENT ITEMS IN A FEED

FIELD OF THE INVENTION

The present technology relates to the field of content provision. More particularly, the present technology relates to techniques for controlling provision of content in a news feed accordance with user preferences.

BACKGROUND

Today, people often utilize computing devices for a wide variety of purposes. Users can use their computing devices, for example, to communicate and otherwise interact with other users. Such interactions are increasingly popular over a social network.

Some interactions in a social network may include the sharing of content. Content can be shared in a variety of manners. One example of a technique to share content with a user in a social network is a news feed. The news feed can be a listing of content items (or stories) that are deemed appropriate for presentation to the user. The news feed for the user can include myriad types of content items. Such content items can include, for example, images uploaded by others in the social network of the user, descriptions of activities of connections of the user, articles regarding subject matter of interest to the user, advertisements directed to the user, etc. As the social network of the user expands and the interests of the user expressed in the social network grow more varied, the amount of content items presented in the news feed of the user can attendantly increase.

SUMMARY

Various embodiments of the present disclosure can include systems, methods, and non-transitory computer readable media configured to provide a plurality of control modes to selectively control display of content items in a news feed of a user. One or more content items associated with a predetermined entity selected by the user or a predetermined event are identified based on at least one control mode of the plurality of control modes. Display of at least one content item of the one or more content items is provided in the news feed of the user.

In an embodiment, the at least one control mode is an identity based control mode. The identifying one or more content items comprises comparing the one or more content items with features indicative of content items associated with the predetermined entity.

In an embodiment, the providing display of at least one content item comprises positioning the at least one content item in a top most position of the news feed of the user.

In an embodiment, systems, methods, and non-transitory computer readable media aggregate a plurality of content items into a single unit, the at least one content item including the single unit.

In an embodiment, systems, methods, and non-transitory computer readable media fix a relative location of the at least one content item in the news feed of the user after reading of the at least one content item by the user.

In an embodiment, systems, methods, and non-transitory computer readable media determine content items of the at least one content item that have not been reviewed by the user in a first session. The content items of the at least one content item that have not been reviewed by the user are positioned in the first session in a top most position of the news feed of the user in a second session.

In an embodiment, systems, methods, and non-transitory computer readable media provide an indication of emphasis regarding presentation of the at least one content item in a top most position in the news feed of the user.

In an embodiment, the at least one control mode is an event based control mode, and the identifying one or more content items comprises performing an analysis based on at least one of a tag associated with the one or more content items or text associated with the one or more content items.

In an embodiment, the tag is associated with an event from a plurality of predetermined major life events.

In an embodiment, the performing an analysis is based on a detection and a count of predetermined words in the text associated with the one or more content items.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates a method to provide display of content items in accordance with a control mode, according to an embodiment of the present disclosure.

Figure 1:
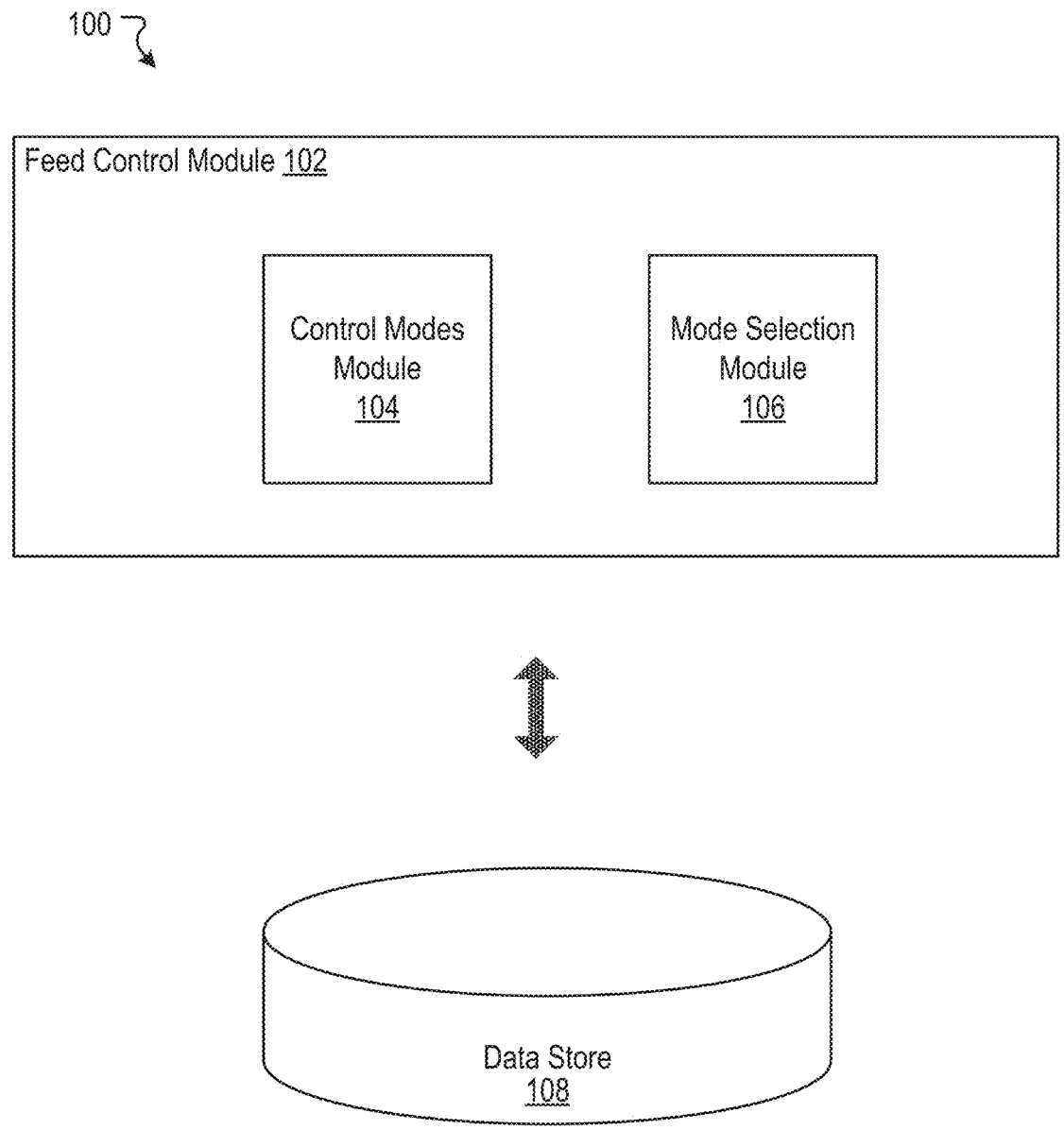
FIG. 1 illustrates a system including an example feed control module, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Controlling Content Items in News Feed

A news feed can be an effective technique to present content items (or stories) to a user. In some instances, a news feed can constitute an ordered listing of content items presented for the user to stay apprised of events in her social network. The news feed for the user can include various types of content items. The content items can include, for example, images uploaded by others in a social network of the user, accounts of activities of connections of the user, articles regarding subject matter of interest to the user, advertisements directed to the user, etc. The amount of content items presented to the user can increase as the social network of the user swells, the interests of the user grow more varied, and the interactions of the user expand.

As the content items presented to the user in a news feed increase, the likelihood that the user will be presented with content items reflecting different topics or subject matter can accordingly increase. When multiple content items reflecting different subject matter are presented to the user, user experience can be enhanced when the user has significant interest in all of the subject matter. On the other hand, when multiple content items reflecting different subject matter are presented to the user, user experience can be compromised when the user has little interest in the subject matter. In the latter circumstances, repeated presentation of content items reflecting subject matter in which the user has little interest can diminish the utility of the news feed. In addition, when the news feed includes content items that are both of interest and not of interest to the user, the former can be difficult for the user to discover and accordingly the user can lose important opportunities to learn about interesting information.

An improved approach rooted in computer technology to provide content items in a news feed overcomes these and other disadvantages associated with conventional approaches implemented in computer technology. In general, systems, methods, and computer readable media of the present disclosure can perform content analysis on content items for potential presentation to a user in a news feed of the user. The content analysis can be based on analysis of metadata of content items to provide an indication of a type or category with which a content item is associated. Based on the content analysis, control modes are capable of selecting and presenting content items in accordance with preferences of the user. The control modes are selectable by the user. As one example, an identity based control mode can identify content items that are associated with predetermined persons, pages, groups, or other entities selected by the user for presentation in the news feed of the user. The content items can include certain content items that are posted by the entity or that relate to the entity selected by the user. In addition, certain criteria can be applied to filter the content items to optimize their relevance to the user. As another example, a default control mode can allow presentation of content items according to a default news feed technique. As yet another example, an event based control mode can identify content items that relate to important or special events for presentation in the news feed of the user. As yet still another example, an elimination control mode can exclude content items from the news feed of the user. The presentation of the content items selected for provision to the user according to the control modes can include prominent display of the content items in a manner that facilitates their access by the user. For example, with respect to the identity based control mode, the selected content items can be presented at a top most portion of the news feed so that they are most prominently displayed. More details regarding the systems, methods, and computer readable media of the present disclosure are discussed herein.

FIG. 1 illustrates an example system 100 including an example feed control module 102 configured to allow selective control of content items for presentation in a news feed of a user, according to an embodiment of the present disclosure. In some embodiments, the feed control module 102 can be implemented as a news feed managed by a social networking system that can select content items (or stories) for presentation to a user. A content item (e.g., post, story, etc.) can include one or more of text information, an image, a video, audio, or the like. For example, the content item can be provided (e.g., created, uploaded, shared, etc.) by a user to a social networking system or by any other type of system in communication with the social networking system.

The feed control module 102 can include a control modes module 104 and a mode selection module 106. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the feed control module 102 can be implemented in any suitable combinations.

The control modes module 104 can initiate one or more control modes to selectively determine content items to present in a news feed of a user. An identity based control mode can determine content items that are associated with predetermined persons, pages, groups, or other entities selected by the user for presentation in the news feed of the user. Content items associated with such entities can be presented more prominently in the news feed of the user in comparison to other content items. A default control mode can allow presentation of content items according to a default news feed technique. In the default control mode, content items for presentation in the news feed of the user can match generalized interests of the user. An event based control mode can determine content items that relate to events identified as special or important for presentation in the news feed of the user. As just one example, weddings involving connections of the user can be selected for presentation in the news feed of the user in the event based control mode. An elimination control mode can exclude certain types of content items identified by the user from the news feed of the user. For example, content items associated with certain entities can be excluded. The control modes can represent a spectrum of filter granularity relating to selective presentation of content items in the news feed of the user. The control modes can be selected by a user associated with the news feed, an administrator of a system implementing the feed control module 102, or a combination of both. The control modes module 104 is discussed in more detail herein.

The mode selection module 106 can receive instructions to implement one or more control modes in presentation of content items in a news feed of a user. The mode selection module 106 can allow, for example, a user to select one or more control modes so that the user can manage presentation of content items in her news feed in accordance with her preferences. As another example, the mode selection module 106 can allow a system administrator of a social networking system to implement one or more control modes deemed optimal for the user. To elicit selection of control modes, the mode selection module 106 can provide a user interface that allows selection of the control modes.

For example, the mode selection module 106 can provide a user interface for display on a client device associated with a user. In this example, the user interface can include display of a selection of one or more control modes that can be implemented by the feed control module 102. The user interface can prompt the user to select one or more desired control modes. Upon selection by the user of a desired control mode, the mode selection module 106 can communicate the selection to the control modes module 104 to initiate implementation of the selected control mode. In addition, the user interface can prompt the user to provide additional information to configure or inform the implementation of the selected control mode. For example, if the user has selected the identity based control mode, the user interface can prompt the user to identify or define entities of which associated content items are to be prominently displayed in the news feed in accordance with the identity based control mode. As another example, if the user has selected the event based control mode, the user interface can prompt the user to identify or define the types of events for which associated content items are to be displayed in the news feed. In addition, the mode selection module 106 can provide a user interface that allows the user to change control modes. For example, if the identity based control mode was selected by the user, the user interface can allow the user to terminate the identity based control mode and initiate a different control mode. Various features and functionality of the user interface are discussed in more detail herein.

In some embodiments, the feed control module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the feed control module 102 can be, in part or in whole, implemented as software running on one or more computing devices or systems, such as on a server or a client computing device. For example, the feed control module 102 can be implemented as or within a dedicated application (e.g., app), a program, or an applet running on a user computing device or client computing system. In some instances, the feed control module 102 can be, in part or in whole, implemented within or configured to operate in conjunction or be integrated with a social networking system (or service), such as a social networking system 630 of FIG. 6. Likewise, in some instances, the feed control module 102 can be, in part or in whole, implemented within or configured to operate in conjunction or be integrated with client computing device, such as a user device 610 of FIG. 6. It should be understood that many variations are possible.

The data store 108 can be configured to store and maintain various types of data, such as the data relating to support of and operation of the feed control module 102. The data can include data relating to, for example, content items (e.g., text information, user information, contextual information), features relating to content items, scores determined for content items, selection of control modes by a user, threshold values, date and time regarding sessions of news feed access, etc. The data store 108 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the feed control module 102 can be configured to communicate and/or operate with the data store 108.

Figure 2:
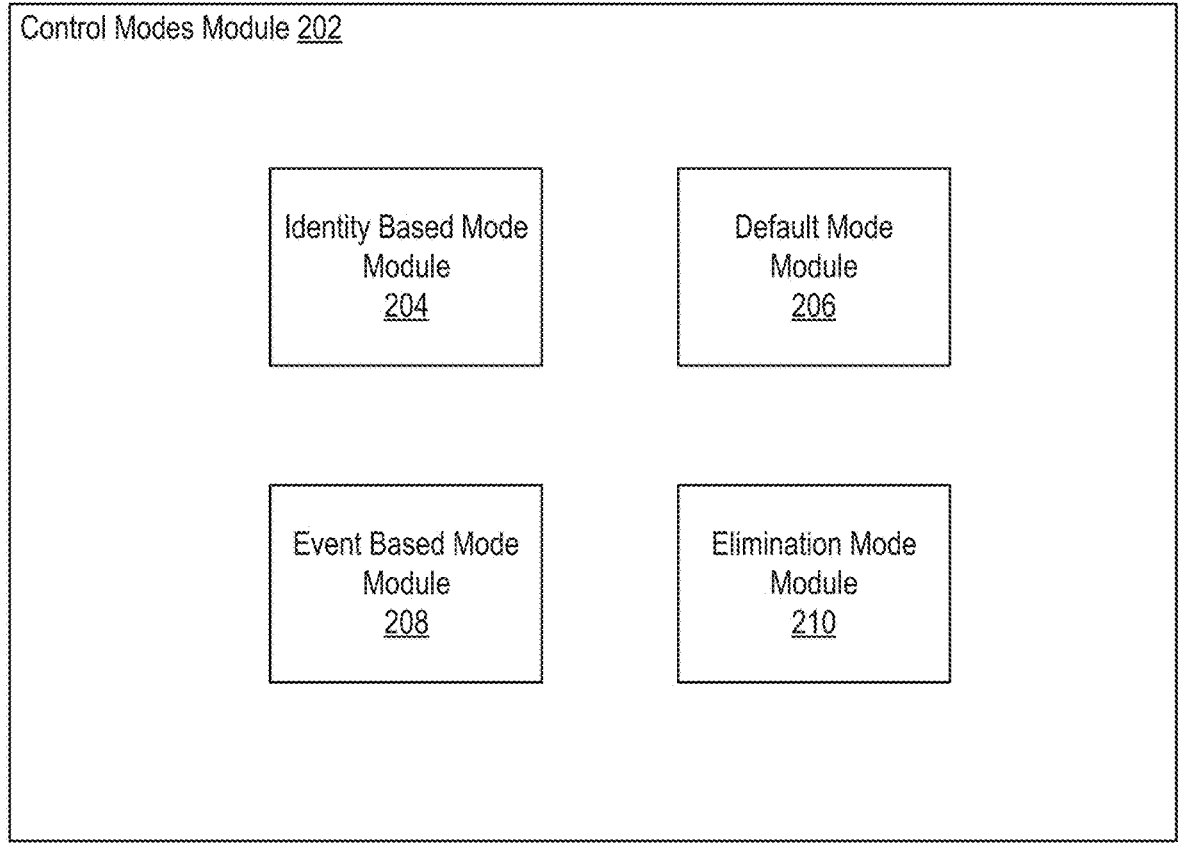
FIG. 2 illustrates an example control modes module, according to an embodiment of the present disclosure.

FIG. 2 illustrates an example control modes module 202, according to an embodiment of the present disclosure. In some embodiments, the control modes module 104 of FIG. 1 can be implemented with the control modes module 202. As shown in the example of FIG. 2, the control modes module 202 can include an identity based mode module 204, a default mode module 206, an event based mode module 208, and an elimination mode module 210.

The identity based ("see first") mode module 204 can be configured to select and prominently display content items associated with predetermined entities in accordance with an identity based control mode. An entity can include, for example, a person, a page associated with an organization, a group, or any other type of user, member, or construct of a social networking system. In response to a selection of entities for which associated content items are to be prominently displayed, the identity based mode module 204 can identify content items associated with the selected entities based on features indicative of such content items. The features can be applied to identify content items to be displayed in accordance with the identity based control mode and user-defined preferences for the control mode. The features can include, for example, whether the content item is associated with (e.g., published by, relating to, etc.) an entity selected by the user, whether the content item has been previously reviewed by the user, and other considerations.

In one example technique, a content item can be analyzed based on a degree, such as a quantitative degree, to which a content item matches the features. The content items that match the features to a threshold degree can be identified as content items for potential presentation. In this regard, a content item identified for potential presentation, for example, can be assigned a score that satisfies a high score threshold. With respect to a content item selected for potential presentation, a score satisfying a high score threshold can be a score determined by a default news feed technique, such as a technique implemented by the default mode module 206, plus an addend (boost value) that results in a sum that satisfies the high score threshold. The high score threshold satisfied by a content item selected for presentation in accordance with the identity based control mode can provide a mechanism to distinguish the content item from other content items having lower scores not selected for display in accordance with the identity based control mode.

Further, the identity based control mode 204 can select certain types of content items for potential display in the news feed. For example, when a content item is a posting by a selected entity, the identity based control module 204 may apply a filter to select for presentation in the news feed only those content items, or certain types of those content items, that have been published on a timeline of the entity on an associated page in a social networking system. As another example, if an entity is identified or tagged in a content item, the identity based control module 204 can apply a filter so that the content item can be selected for presentation, even if the content item was not generated by the entity. As yet another example, the identity based control module 204 can apply a filter to select for presentation in the news feed content items that relate to sharing or posting of content in a social networking system implementing the feed control module 102 or in another content sharing system in communication with the social networking system. The identity based control module 204 can apply one or more of such filters. The filters can facilitate selection of content items for potential display that satisfy a confidence, relevance, significance, or other type of threshold.

The identity based control mode module 204 can provide prioritized or otherwise prominent display of content items selected for presentation. In one example technique, such content items can be ranked and sorted based on their scores. A threshold number of a set of highest scoring content items or content items having scores that satisfy a threshold value can be identified. Some or all of the content items that satisfy the threshold number or the threshold value can be displayed, pinned, or otherwise positioned at a top most portion of the news feed. Such content items can be prioritized to appear above other content items selected for presentation based on other control modes.

In some implementations, a reference or other indicator can be presented as part of or adjacent to each content item identified for prioritized presentation. For example, a star or other indication of emphasis can be displayed near or within the display of each content item when the content item is first displayed in the news feed. To inform the user why the content item is being prominently displayed, an explanation also can be presented to the user. For example, the explanation can appear above the prominent presentation of content items. In this regard, the explanation can include a statement that the presented content items that follow the explanation are content items that have been selected for prominent presentation in accordance with the identity based control mode. The star or other indication of emphasis can appear in the explanation in some implementations. In other implementations, the star or other indication of emphasis can appear as part of each content item presented in accordance with the entity based control mode. In certain implementations, when the user performs a gesture in connection with the user interface, such as hovering a cursor over the indication of emphasis, a menu of options can be displayed to allow the user to change the control mode by which content items are selected for presentation in the news feed of the user.

After the content item is viewed by the user, the content item can be excluded from prominent display in the news feed and potentially displayed without the indication of emphasis in accordance with control modes other than the identity based control mode. In various implementations, viewing by the user that prompts exclusion of a content item from subsequent, prominent display can be, for example, an impression displayed to the user of a preview of the content item or selection of the preview by the user to access to the entire content item.

In some instances, only a subset of the set of content items that satisfy the threshold number or the threshold value are prominently displayed in the news feed in accordance with the identity based control mode. The number of the subset can be based on optimizing the presentation of the content items in view of the limited space provided by a computing device to display the news feed and competition with other content (e.g., content items selected for presentation in accordance with other control modes) to be displayed, among other factors. Content items in the set that were not been displayed in the news feed during prior access (e.g., a prior session) by the user to the news feed can be sorted with other content items selected for presentation to the user during subsequent access (e.g., a later session) by the user to the news feed. In some embodiments, content items selected for presentation and, in fact, prominently displayed in the news feed to the user in a prior or current session are not again prominently displayed during a later session.

When one or more content items are prominently displayed in the news feed and are reviewed (e.g., selected for full access) by the user, the location of these content items can be fixed (or "frozen") in terms of their relative location in the news feed. The indication of emphasis associated with the content items can be removed. When one or more content items are prominently displayed in the news feed but are not reviewed by the user, the one or more content items can be prominently displayed in a later session during which the user accesses the news feed. For example, if during a first session 10 content items are prominently displayed in the news feed but the user has only reviewed three of the ten content items, then the remaining seven content items can be prominently displayed in a subsequent session during which the user accesses the news feed. The subsequent session may also include display of new content items selected for presentation that have been identified in accordance with the identity based control mode since the first session. The content items selected for presentation but not reviewed by the user with respect to a previous session can be re-ranked and combined with the new content items selected for potential presentation with respect to a subsequent session, and the highest scoring content items of the combinations based on an applicable threshold can be prominently displayed in the subsequent session.

In some instances, content items selected for potential presentation to the user in accordance with the identity based control mode can be numerous. In one instance, numerous content items can occur when an entity selected by a user for prominent display of associated content items is a prolific generator of content items. For example, an entity that is a publisher of news content can generate many content items in a period of time. To avoid over display or an appearance of clutter with respect to content items associated with the entity, the identity based control mode module 204 can aggregate content items from the entity so that the content items are displayed in less space than if the content items were displayed individually. For example, five content items from an entity can be aggregated into one unit, such as a block, displaying an aggregation of the five content items. In addition, if the number of content items selected for presentation to the user satisfies a threshold value, then some of the content items can be aggregated into a unit for display while other of the content items can be later displayed to the user in response to an indication that the user desires to see the other content items. For example, if eight content items are to be displayed, four content items thereof can be aggregated into a unit for display and the user can be presented with an option in the user interface to display the remaining four content items. When the option is selected by the user, the remaining four content items can be displayed to the user.

The identity based control mode module 204 can pace presentation of content items selected for potential presentation. In one instance, pacing presentation of content items can be performed when the amount of content items is large. The presentation of content items can be paced based on passage of a threshold amount of time between accessing the news feed. In this regard, content items associated with an entity and selected for presentation may be displayed to the user in a first session of the news feed during a first time. Content items associated with the entity and selected for presentation are not displayed to the user in a later second session during a second time unless the threshold amount of time between the first time and the second time has passed. For example, assume that an entity, such as a content publisher, is a prolific generator of content items. Assume further that the user during a first session of the news feed at a first time in the day sees a certain number of content items associated with the entity. If a second session of the news feed at a second time in the day in relation to the first time does not satisfy a threshold amount of time, content items selected for presentation to the user are not displayed in the news feed. However, if a second access by the user of the news feed at a second time in the day in relation to the first time does satisfy a threshold amount of time, content items selected for presentation to the user are displayed in the news feed.

The default mode module 206 can be configured to select content items for presentation to a user based on generalized interests of the user in accordance with a default control mode. For example, the default control mode can include a technique to identify relevant content items for all users of a social networking system. In one embodiment, the default mode module 206 can train (and retrain) machine learning models for ranking content items for potential presentation in news feeds of users of a social networking system. For example, the default mode module 206 can divide its users into different sets based on various attributes of the users (e.g., age, ethnicity, income, language, etc.) and can generate one or more models for each set of users. Users with different attributes may have different behavioral patterns that can reflect their interests in different topics reflected by content items. As a result, different models for ranking content items for different sets of users can provide more accurate ranking of content items and provide higher likelihood that users will be interested in the topics reflected by the content items presented to them.

In accordance with the default control mode, features used to train the models can include interactions of users with content items of a news feed. Such interactions can include, for example, selecting a link in the content item, commenting on the content item, liking the content item, and hiding the content item. The default mode module 206 can use the models for each set of users to determine levels of interest of a user in topics reflected by content items. The level of interest of a user in each topic can be indicated by a topic score. The social networking system can rank a content item for potential presentation to a user based on a topic(s) reflected by the content item and the topic score(s) of the user for the topic(s). In some instances, an aggregate score can be determined for the user in connection with each content item overall, and the content items can be ranked based on their aggregate scores. Content items having a ranking that satisfies a selected threshold value can be presented to the user in her news feed.

The event based mode ("highlights only") module 208 can be configured to select and display content items associated with predetermined events, such as major life events associated with a user or connections of the user, in accordance with an event based control mode. The major life events can be any significant activity or occurrence, such as, for example, a child's birth, a school graduation, a wedding, or the like. When selected, content items associated with major life events can be displayed in the news feed of the user along with a marking or explanation regarding why the content item is being displayed. For example, an explanation can be displayed adjacent to a content item that explains that the content item relates to a major life event.

The content items can be identified in accordance with the event based control mode in a variety of techniques. In one example technique, content items can be previously tagged with information indicative of major life events. For example, before the content item was published, a generator of the content item may have selected one of a plurality of predetermined major life events with which to tag the content item. In this example, the tag associated with the content item can be an indication that the content item relates to the selected major life event. In another example technique, textual analysis can be applied determine potential association of a content item with a major life event. Textual analysis of a content item, or responses to the content item, can include detection and count of a number of occurrences of certain predetermined words that are indicative of content items relating to a major life event. For example, words, such as "congratulations", "toast", and the like, can be detected and counted to determine whether the content item relates to a major life event.

The event based mode module 208 can assign scores to content items that reflect a confidence level regarding whether a content item relates to a major life event. For example, a content item associated with a tag "wedding" may receive a relatively high score, a content item for which the word "congratulations" appeared twice may receive a relatively high score, and a content item for which the word "congratulations" appeared once may receive a relatively low score. The content items can be sorted based on their scores. A threshold number of the highest ranking content items or a number of content items satisfying a threshold score can be selected for presentation in accordance with the event based control mode in the news feed of the user.

The elimination mode ("unfollow") module 210 can be configured to identify content items associated with selected entities and not to display the content items associated with the selected entities in a news feed of a user who selected the entities. Based on a selection of entities for which associated content items are not to be displayed, the elimination mode module 210 can identify content items associated with the selected entities based on features indicative of content items associated with the selected entities. The features can be applied to identify content items not to be displayed in accordance with the elimination control mode. In one example technique, a content item can be analyzed based on a degree, such as a quantitative degree, to which a content item matches the features. The content items that match the features to a threshold degree can be identified as content items potentially not to be displayed. These content items can be ranked, scored, and eliminated from presentation to the user based on satisfaction of a suitable threshold.

Figure 3:
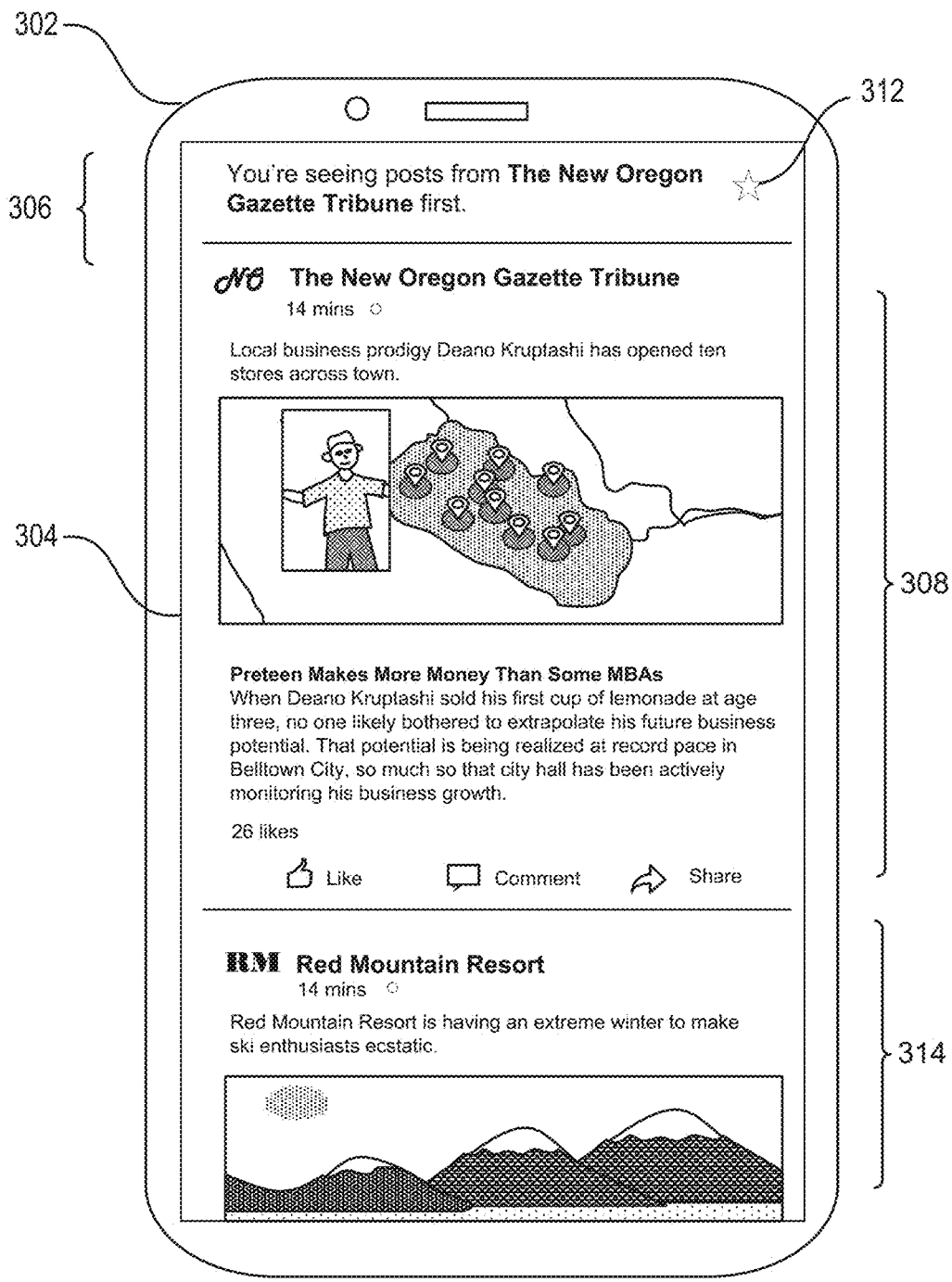
FIG. 3 illustrates an example user interface in accordance with a control mode, according to an embodiment of the present disclosure.

FIG. 3 illustrates an example user interface 304 displayed in a viewport of a computing device 302 associated with a user, according to an embodiment of the present disclosure. The user interface 304 may be provided through an application (e.g., a social networking application) running on the computing device 302. In the example shown, the user interface 304 presents a news feed for displaying stories in accordance with an identity based control mode. In other examples, the display of stories can be in accordance with other control modes. The news feed can include a section 306 that includes an explanation that indicates to the user that the stories are being displayed in accordance with the identity based control mode. The section 306 includes a star 312, which can be selected by the user, as an indication of emphasis to inform the user that one or more stories that immediately follow the section 306 are associated with an entity whose content items have been selected by the user for prioritized display in the news feed. Other forms of indications of emphasis in addition to or as an alternative to a star are possible. The news feed includes a story 308 published by or associated with an entity, associated content items of which the user has chosen to prioritize for display in the news feed over content items associated with other entities. The entity associated with the story 308 was selected by the user as being associated with content items that have special relevance or interest to the user. The story 308 is prioritized in the news feed by its display in a top most portion of the news feed. Although in the example shown only the one story 308 is presented for purposes of illustration, additional stories published or associated with the entity may also be shown in the top most portion of the news feed in accordance with the identity based control mode. A story 314 is also displayed in the news feed under the story 308. The story 314 is not related to an entity associated with content items that have been selected by the user for prioritized display. Accordingly, the story 314 is not displayed in the top most position in the news feed and does not include an indication of emphasis.

Figure 4:
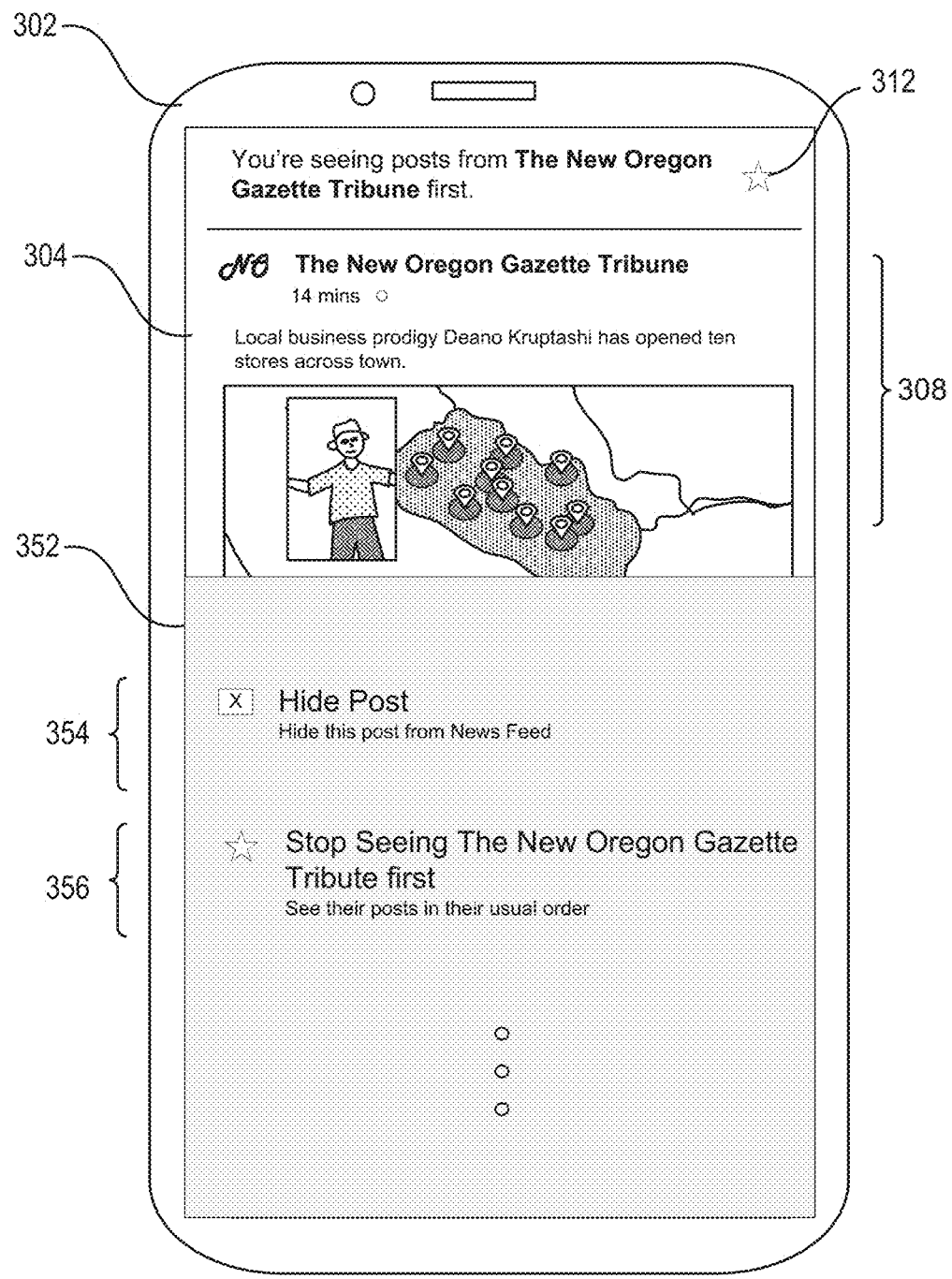
FIG. 4 illustrates an example user interface including a pop up screen in accordance with a control mode, according to an embodiment of the present disclosure.

FIG. 4 illustrates an example pop up screen 352 displayed in the user interface 304 presented in a viewport of the computing device 302 of FIG. 3 in response to selection of the star 312 by the user, according to an embodiment of the present disclosure. In the example shown, the screen 352 includes various options for the user to choose. An option 354 allows the user to hide (or remove) from the news feed the story 308 previously prioritized for display in accordance with the identity based control mode. In this manner, the user can choose not to view the story 308 while still enjoying prioritized display of other content items associated with the entity that relates to the story 308. An option 356 allows the user to deselect for prioritized display content items associated with the entity relating to the story 308. In this manner, the option 356 allows the user to cease prioritized display of all content items associated with the entity. As shown, the user may be presented with other options in the screen 352.

FIG. 5 illustrates an example method 500 to display content items in accordance with one or more control modes, according to an embodiment of the present disclosure. It should be appreciated that there can be additional, fewer, or alternative steps performed in similar or alternative orders, or in parallel, in accordance with the various embodiments discussed herein unless otherwise stated.

At block 502, the method 500 can provide a plurality of control modes to selectively control display of content items in a news feed of a user. At block 504, the method 500 can Identify one or more content items associated with a predetermined entity selected by the user or a predetermined event based on at least one control mode of the plurality of control modes. At block 506, the method 500 can provide display of at least one content item of the one or more content items in the news feed of the user. Other suitable techniques that incorporate various features and embodiments of the present disclosure are possible.

Social Networking System—Example Implementation

Figure 6:
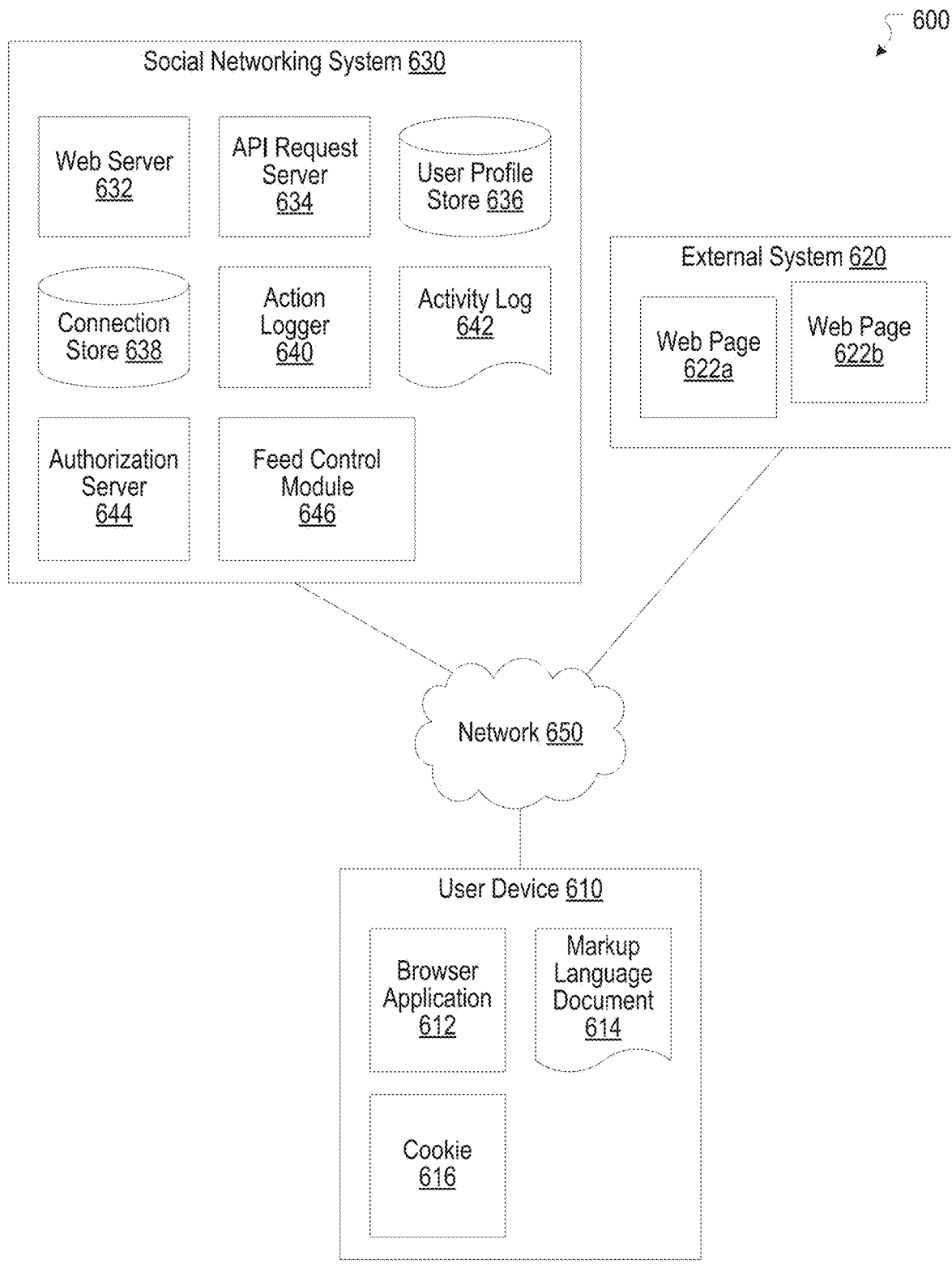
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system

620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a feed control module 646. The feed control module 646 can be implemented with the feed control module 102, as discussed in more detail herein. In some embodiments, one or more functionalities of the feed control module 646 can be implemented in the user device 610.

Hardware Implementation

Figure 7:
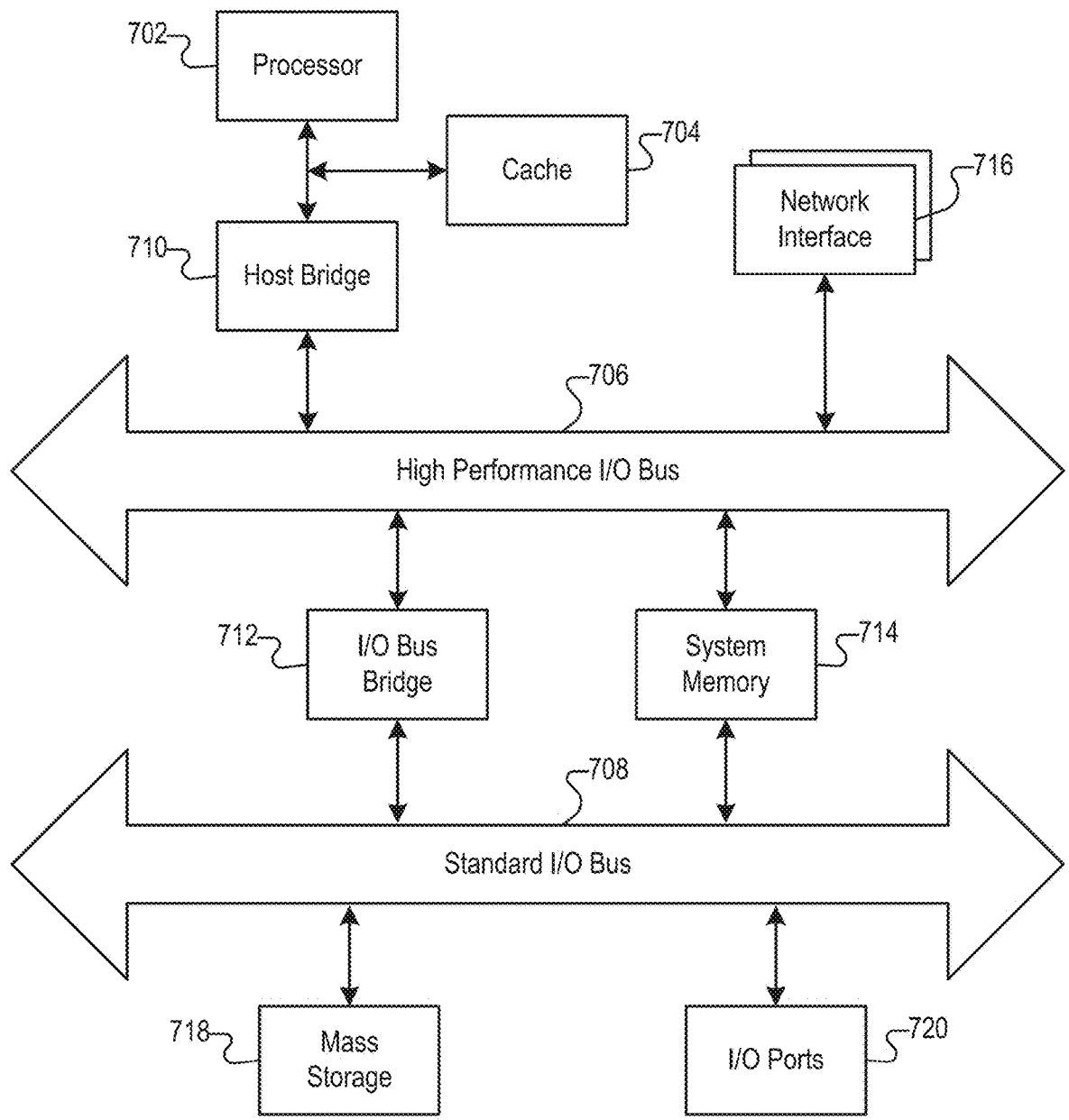
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    providing, by a computing system, a plurality of control modes to selectively control a prioritized display of one or more content items in a news feed of a user, wherein the plurality of control modes includes at least one of: an identity based control mode, an event based control mode, a default mode, or an elimination control mode;
    identifying, by the computing system, one or more first content items associated with a first predetermined entity selected by the user or a first predetermined event selected by the user based on at least one control mode of the plurality of control modes, wherein the at least one control mode of the plurality of control modes is selected by the user through a user interface prompt;
    providing, by the computing system, the prioritized display of at least one first content item of the one or more first content items associated with the first predetermined entity or the first predetermined event in a top most position of the news feed of the user, wherein the news feed includes an indication that the at least one first content item is being displayed in accordance with the at least one control mode selected by the user and wherein the prioritized display of the at least one first content item includes an indication of emphasis that, when selected by the user, provides an explanation of why the at least one first content item is displayed in the top most position of the news feed and provides an option to deselect the one or more first content items associated with the first predetermined entity or the first predetermined event from the prioritized display; and
    providing, by the computing system, an updated prioritized display of one or more second content items associated with a second predetermined entity selected by the user or a second predetermined event selected by the user based on the at least one control mode and based on a selection of the option to deselect the one or more first content items.

2. The computer-implemented method of claim 1, wherein the at least one control mode is the identity based control mode, and wherein the identifying one or more first content items comprises:
    comparing the one or more first content items with features indicative of content items associated with the predetermined entity.

3. The computer-implemented method of claim 2, wherein the providing the prioritized display of at least one content item comprises:
    pinning the at least one first content item in the top most position of the news feed of the user.

4. The computer-implemented method of claim 2, further comprising:
    aggregating a plurality of the one or more first content items, including the at least one first content item, into a single unit.

5. The computer-implemented method of claim 2, further comprising:
    fixing a relative location of the at least one first content item in the news feed of the user after reading of the at least one first content item by the user.

6. The computer-implemented method of claim 2, further comprising:
    determining at least one unreviewed first content items of the at least one first content item that has not been reviewed by the user in a first session; and
    positioning the at least one unreviewed first content items of the at least one first content item that has not been reviewed by the user in the first session in the top most position of the news feed of the user in a second session.

7. The computer-implemented method of claim 2, further comprising:
    providing the indication of emphasis and the at least one first content item in the top most position in the news feed of the user.

8. The computer-implemented method of claim 1, wherein the at least one control mode is the event based control mode, and wherein the identifying one or more first content items comprises:
    performing an analysis based on at least one of: a tag associated with the one or more first content items or text associated with the one or more first content items.

9. The computer-implemented method of claim 8, wherein the tag is associated with an event from a plurality of predetermined major life events.

10. The computer-implemented method of claim 8, wherein the performing an analysis is based on a detection and a count of predetermined words in the text associated with the one or more first content items.

11. A system comprising:
    at least one processor; and
    a memory storing instructions that, when executed by the at least one processor, cause the system to perform:
        providing a plurality of control modes to selectively control a prioritized display of one or more content items in a news feed of a user, wherein the plurality of control modes includes at least one of: an identity based control mode, an event based control mode, a default mode, or an elimination control mode;

identifying one or more first content items associated with a first predetermined entity selected by the user or a first predetermined event selected by the user based on at least one control mode of the plurality of control modes, wherein the at least one control mode of the plurality of control modes is selected by the user through a user interface prompt;

providing the prioritized display of at least one first content item of the one or more first content items associated with the first predetermined entity or the first predetermined event in a top most position of the news feed of the user, wherein the news feed includes an indication that the at least one first content item is being displayed in accordance with the at least one control mode selected by the user and wherein the prioritized display of the at least one first content item includes an indication of emphasis that, when selected by the user, provides an explanation of why the at least one first content item is displayed in the top most position of the news feed and provides an option to deselect the one or more first content items associated with the first predetermined entity or the first predetermined event from the prioritized display; and providing an updated prioritized display of one or more second content items associated with a second predetermined entity selected by the user or a second predetermined event selected by the user based on the at least one control mode and based on a selection of the option to deselect the one or more first content items.

12. The system of claim 11, wherein the at least one control mode is the identity based control mode, and wherein the identifying one or more first content items comprises:
comparing the one or more content first items with features indicative of content items associated with the predetermined entity.

13. The system of claim 12, wherein the providing the prioritized display of at least one content item comprises:
pinning the at least one first content item in the top most position of the news feed of the user.

14. The system of claim 12, further comprising:
aggregating a plurality of the one or more first content items, including the at least one first content item, into a single unit.

15. The system of claim 12, further comprising:
determining at least one unreviewed first content items of the at least one first content item that has not been reviewed by the user in a first session; and
positioning the at least one unreviewed first content item of the at least one first content item that has not been reviewed by the user in the first session in the top most position of the news feed of the user in a second session.

16. A non-transitory computer-readable storage medium including instructions that, when executed by at least one processor of a computing system, cause the computing system to perform a method comprising:

providing a plurality of control modes to selectively control a prioritized display of one or more content items in a news feed of a user, wherein the plurality of control modes includes at least one of: an identity based control mode, an event based control mode, a default mode, or an elimination mode;

identifying one or more first content items associated with a first predetermined entity selected by the user or a first predetermined event selected by the user based on at least one control mode of the plurality of control modes, wherein the at least one control mode of the plurality of control modes is selected by the user through a user interface prompt;

providing the prioritized display of at least one first content item of the one or more first content items associated with the first predetermined entity or the first predetermined event in a top most position of the news feed of the user, wherein the news feed includes an indication that the at least one first content item is being displayed in accordance with the at least one control mode selected by the user and wherein the prioritized display of the at least one first content item includes an indication of emphasis that, when selected by the user, provides an explanation of why the at least one first content item is displayed in the top most position of the news feed and provides an option to deselect the one or more first content items associate with the first predetermined entity or the first predetermined event from the prioritized display; and providing an updated prioritized display of one or more second content items associated with a second predetermined entity selected by the user or a second predetermined event selected by the user based on the at least one control mode and based on a selection of the option to deselect the one or more first content items.

17. The non-transitory computer-readable storage medium of claim 16, wherein the at least one control mode is the identity based control mode, and wherein the identifying one or more first content items comprises:
comparing the one or more first content items with features indicative of content items associated with the predetermined entity.

18. The non-transitory computer-readable storage medium of claim 17, wherein the providing the prioritized display of at least one content item comprises:
pinning the at least one first content item in the top most position of the news feed of the user.

19. The non-transitory computer-readable storage medium of claim 17, further comprising:
aggregating a plurality of the one or more first content items, including the at least one first content item, into a single unit.

20. The non-transitory computer-readable storage medium of claim 17, further comprising:
determining at least one unreviewed first content items of the at least one first content item that has not been reviewed by the user in a first session; and
positioning the at least one unreviewed first content items of the at least one first content item that has not been reviewed by the user in the first session in the top most position of the news feed of the user in a second session.

* * * * *